United States Patent
Bruls et al.

(10) Patent No.: US 7,421,127 B2
(45) Date of Patent: Sep. 2, 2008

(54) SPATIAL SCALABLE COMPRESSION SCHEME USING SPATIAL SHARPNESS ENHANCEMENT TECHNIQUES

(75) Inventors: Wilhelmus Hendrikus Alfonsus Bruls, Eindhoven (NL); Frederik Jan De Bruijn, Eindhoven (NL); Nehal R. Dantwala, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 889 days.

(21) Appl. No.: 10/493,274

(22) PCT Filed: Oct. 16, 2002

(86) PCT No.: PCT/IB02/04298

§ 371 (c)(1),
(2), (4) Date: Apr. 21, 2004

(87) PCT Pub. No.: WO03/036980

PCT Pub. Date: May 1, 2003

(65) Prior Publication Data

US 2005/0105814 A1    May 19, 2005

(30) Foreign Application Priority Data

Oct. 26, 2001 (EP) ................................. 01204066
Mar. 8, 2002 (EP) ................................. 02075917

(51) Int. Cl.
  *G06K 9/36* (2006.01)

(52) U.S. Cl. ..................... 382/232; 382/233; 382/254
(58) Field of Classification Search ................. 382/232, 382/233, 254, 240; 347/5, 13, 19, 48; 702/106; 713/300, 162; 714/718; 711/128; 375/240.08, 375/240.2, 240.21, E7.09, E7.092
See application file for complete search history.

(56) References Cited

U.S. PATENT DOCUMENTS 6,128,041 A    10/2000    Han et al. ............... 375/240.12

OTHER PUBLICATIONS

Aravind et al., "Packet Loss Resilience of MPEG-2 Scalable Video Coding Algorithms", IEEE, vol. 6, No. 5, Oct. 1996, pp. 426-435.*

* cited by examiner

*Primary Examiner*—Anh Hong Do

(57) ABSTRACT

A video encoder/decoder with spatial scalable compression schemes using spatial sharpness enhancement techniques is disclosed. The video compression scheme introduces a number of various video enhancement techniques on the base layer. A picture analyzer is used to determine the best or the best mix of various video enhancement 5 techniques. The picture analyzer compares the selected mix of video enhancement techniques with the original full resolution input signal to determine for which of the pixels or groups of pixels a residual enhancement layer is required. Parameters defining the selected mix of video enhancement techniques are transmitted to the decoder layer so the same mix of video enhancement techniques can be used in the decoder layer.

25 Claims, 4 Drawing Sheets

SPATIAL SCALABLE COMPRESSION SCHEME USING SPATIAL SHARPNESS ENHANCEMENT TECHNIQUES

FIELD OF THE INVENTION

The invention relates to a video encoder/decoder, and more particularly to a video encoder/decoder with spatial scalable compression schemes using spatial sharpness enhancement techniques.

BACKGROUND OF THE INVENTION

Because of the massive amounts of data inherent in digital video, the transmission of full-motion, high-definition digital video signals is a significant problem in the development of high-definition television. More particularly, each digital image frame is a still image formed from an array of pixels according to the display resolution of a particular system. As a result, the amounts of raw digital information included in high-resolution video sequences are massive. In order to reduce the amount of data that must be sent, compression schemes are used to compress the data. Various video compression standards or processes have been established, including, MPEG-2, MPEG-4, and H.263.

Many applications are enabled where video is available at various resolutions and/or qualities in one stream. Methods to accomplish this are loosely referred to as scalability techniques. There are three axes on which one can deploy scalability. The first is scalability on the time axis, often referred to as temporal scalability. Secondly, there is scalability on the quality axis, often referred to as signal-to-noise scalability or fine-grain scalability. The third axis is the resolution axis (number of pixels in image) often referred to as spatial scalability or layered coding. In layered coding, the bitstream is divided into two or more bitstreams, or layers. Each layer can be combined to form a single high quality signal. For example, the base layer may provide a lower quality video signal, while the enhancement layer provides additional information that can enhance the base layer image.

In particular, spatial scalability can provide compatibility between different video standards or decoder capabilities. With spatial scalability, the base layer video may have a lower resolution than the input video sequence, in which case the enhancement layer carries information which can restore the resolution of the base layer to the input sequence level.

FIG. 1 illustrates a known layered video encoder 100. The depicted encoding system 100 accomplishes layer compression, whereby a portion of the channel is used for providing a low resolution base layer and the remaining portion is used for transmitting edge enhancement information, whereby the two signals may be recombined to bring the system up to high-resolution. The high resolution video input is split by splitter 102 whereby the data is sent to a low pass filter 104 and a subtraction circuit 106. The low pass filter 104 reduces the resolution of the video data, which is then fed to a base encoder 108. In general, low pass filters and encoders are well known in the art and are not described in detail herein for purposes of simplicity. The encoder 108 produces a lower resolution base stream which is provided to a second splitter 110 from where it is output from the system 100. The base stream can be broadcast, received and via a decoder, displayed as is, although the base stream does not provide a resolution which would be considered as high-definition.

The other output of the splitter 110 is fed to a decoder 112 within the system 100. From there, the decoded signal is fed into an interpolate and upsample circuit 114. In general, the interpolate and upsample circuit 114 reconstructs the filtered out resolution from the decoded video stream and provides a video data stream having the same resolution as the high-resolution input. However, because of the filtering and the losses resulting from the encoding and decoding, certain errors are present in the reconstructed stream. These errors are determined in the subtraction circuit 106 by subtracting the reconstructed high-resolution stream from the original, unmodified high-resolution stream. The output of the subtraction circuit 106 is fed to an enhancement encoder 116 which outputs a reasonable quality enhancement stream.

The disadvantage of filtering and downscaling the input video to a lower resolution and then compressing it is that the video loses sharpness. This can to a certain degree be compensated for by using sharpness enhancement after the decoder. Although this can be made to work reasonably well for most parts of the video picture, there are some areas within the picture where the result remains poor compared to the original picture, e.g., small text parts will remain unreadable even with the most sophisticated enhancement.

SUMMARY OF THE INVENTION

The invention overcomes the deficiencies of other known layered compression schemes by increasing the video compression of a scalable compression scheme by the introduction of a number of video enhancement techniques on the base layer. Using a video picture analyzer, the best mix of the various video enhancement techniques is determined and parameters defining this mix are transmitted to the decoder section as user data. The video picture analyzer compares the selected mix of enhanced bitstreams with the original full resolution input signal and determines for which pixels a residual enhancement layer is required.

According to one embodiment of the invention, a method and apparatus for encoding and decoding an input video bitstream is disclosed. A base bitstream and a residual bitstream are encoded in the following manner. A decoded upscaled base bitstream is enhanced in a first plurality of enhancement units having different enhancement algorithms and a plurality of enhanced base video streams are outputted. The input video bitstream is compared with the decoded upscaled base bitstream and the enhanced base video streams, where the output of the picture analyzer controls the information contained in the residual bitstream. The base bitstream and the residual bitstream are decoded in the following manner. The same enhancement is performed on the decoded base bitstream as was performed in the encoder unit. The decoded residual bitstream is superimposed on the decoded and enhanced base video stream to produce a video output bitstream.

According to another embodiment of the invention, a mix of the enhanced base video streams and the decoded upscaled base bitstream can be used to control the information in the encoded residual bitstream, i.e., which pixels or groups of pixels should be included in the decoded residual bitstream.

These and other aspects of the invention will be apparent from and elucidated with reference to the embodiments described hereafter.

BRIEF DESCRIPTION OF THE DRAWINGS

The invention will now be described, by way of example, with reference to the accompanying drawings, wherein.

DETAILED DESCRIPTION OF THE INVENTION

According to one embodiment of the invention, a spatial scalable compression scheme using spatial sharpness enhancement techniques is disclosed. Briefly, the filtered and downscaled video sequence is compressed. Then, out of the decoded base layer frames, several upscaled versions are processed using a variety of enhancement algorithms. This can include a standard upscaled and filtered, for example, nyquist filtered, versions as well as various sharpness enhancement algorithm versions. A picture analyzer processes all of the information and selects the best or the best mix of these versions. The mix parameters which define the selected mix is also inserted in the encoded residual bitstream, as user data, so that the decoder can exactly reproduce this enhancement.

However, in some areas of the sharpness enhanced frames, the results will remain inadequate. By comparing in the encoder the available original full resolution frames with the enhancement frames, these areas can be detected. Only these detected areas will be compressed and be part of the residual bitstream which is inputted into the enhancement layer. The decoder then decodes the base layer downscaled bitstream and applies the same enhancement parameters on the decoded output as was performed in the encoder. The decoder then decodes the residual bitstream and superimposes the decoded bitstream on the pixels of the already decoded and enhanced base layer frames.

Figure 1:
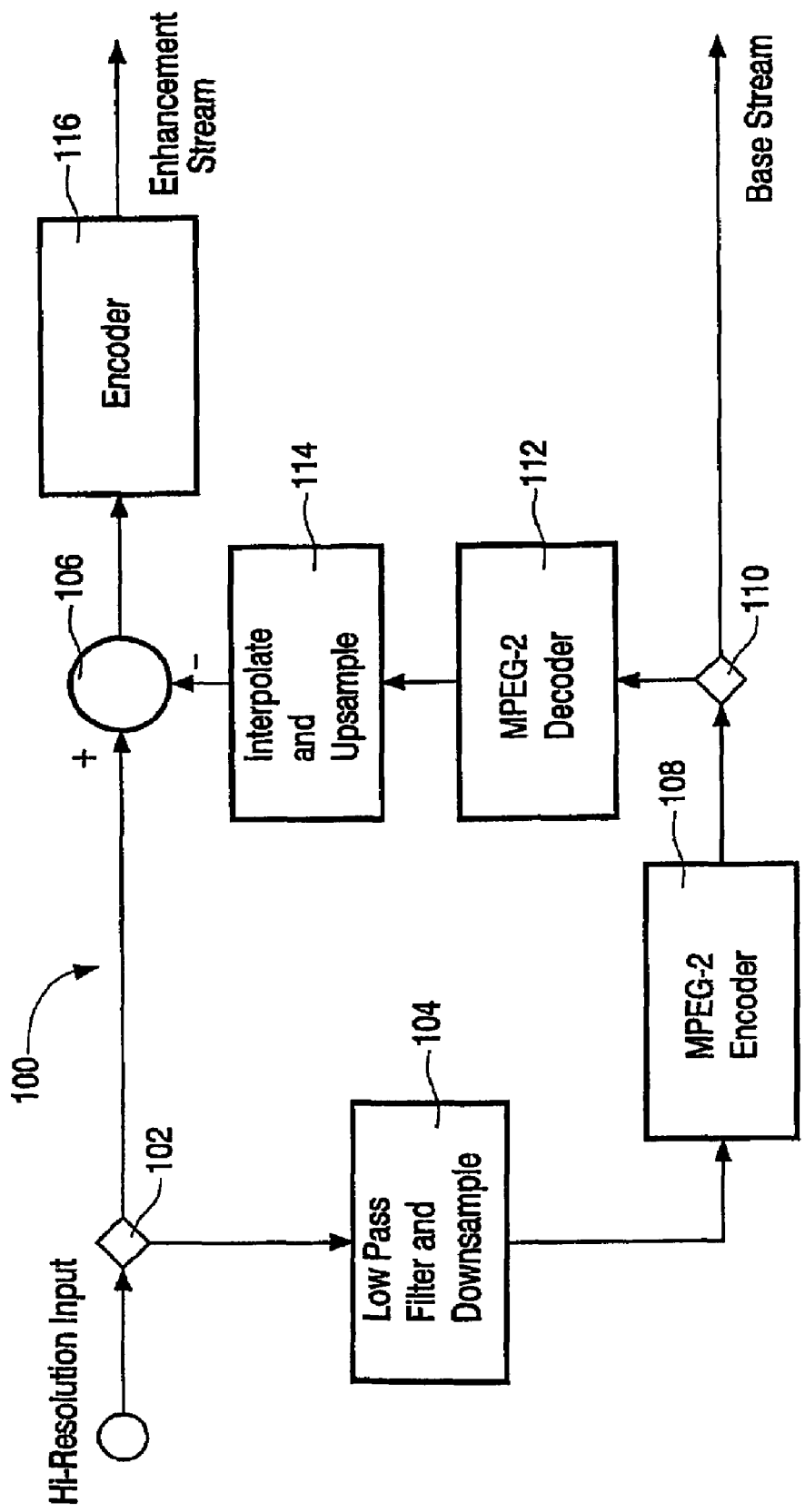
FIG. 1 is a block diagram representing a known layered video encoder.
Figure 2:
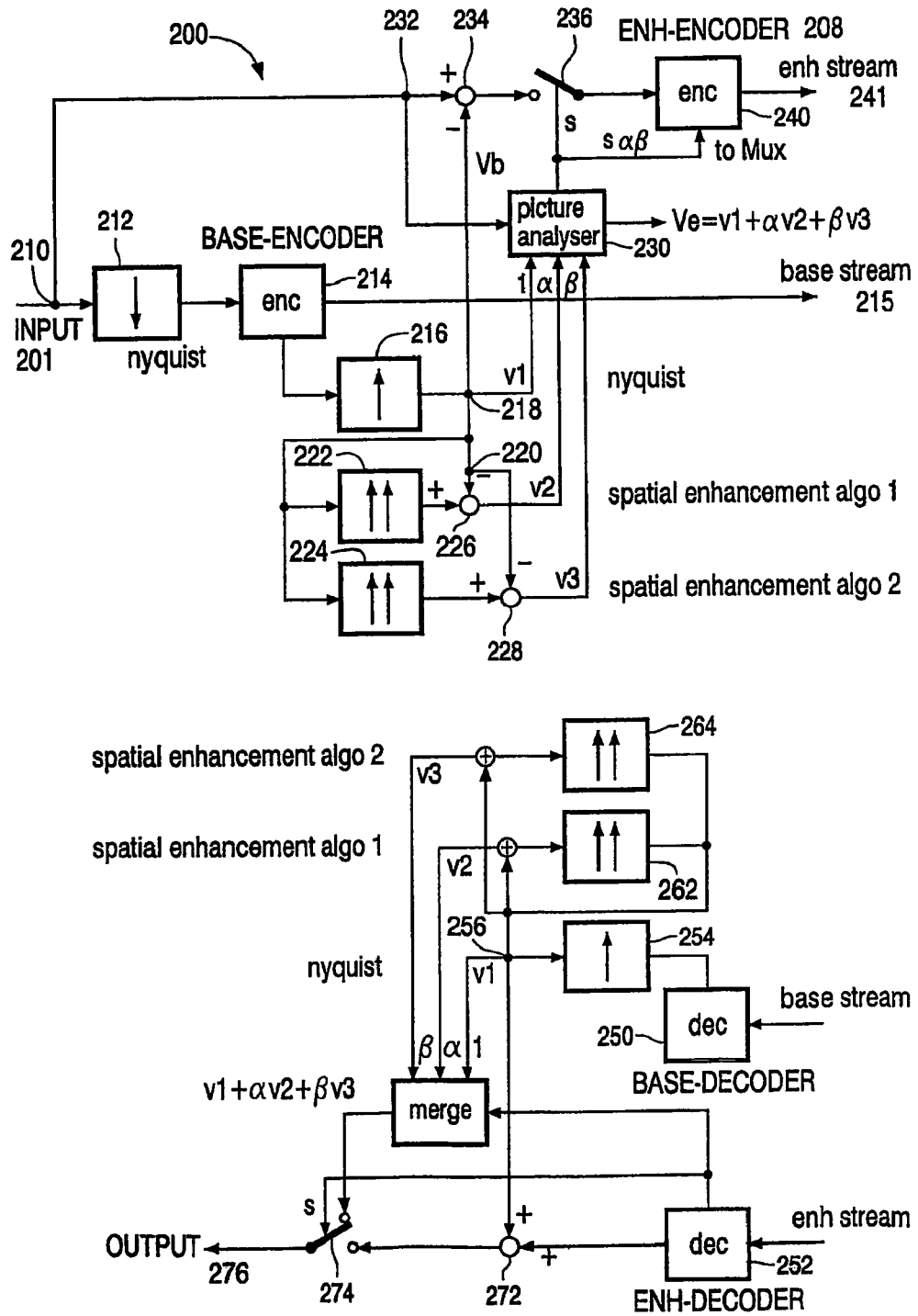
FIG. 2 is a block diagram of a layered video encoder/decoder according to one embodiment of the invention.

This embodiment will now be described in more detail with reference to FIG. 2 which is a block diagram of an encoder/decoder which can be used with the invention. The depicted encoding/decoding system 200 accomplishes layer compression, whereby a portion of the channel is used for providing a low resolution base layer and the remaining portion is used for transmitting edge enhancement information, whereby the two signals may be recombined to bring the system up to high-resolution. The high resolution video input 201 is split by a splitter 210 whereby the data is sent to a low pass filter 212, for example a nyquist filter, and a splitter 232. The low pass filter 210 reduces the resolution of the video data, which is then fed to a base encoder 214. In general, low pass filters and encoders are well known in the art and are not described in detail herein for purposes of simplicity. The base encoder 214 produces a lower resolution base stream 215. The base stream can be broadcasted, received and via a decoder, displayed as is, although the base stream does not provide a resolution which would be considered as high-definition.

The encoder also outputs a decoded base stream to an upscaling circuit 216. In addition, a decoder (not illustrated) can be inserted into the circuit after the encoder 214 to decode the output of the encoder prior to being sent to the upscaling circuit 216. In general, the upscaling circuit 216 reconstructs the filtered out resolution from the decoded video stream and provides a video data stream having the same resolution as the high-resolution input. The upscaled bitstream v1 from the upscaling circuit 216 is split by a splitter 218 and inputted into a picture analyzer 230, a subtraction circuit 234 and a splitter 220. The upscaled bitstream v1 from splitter 220 is inputted into enhancement units 222 and 224. Each enhancement unit operates a different spatial enhancement algorithm which will be explained in more detail below. FIG. 2 has two enhancement units but it will be understood that any number of enhancement units can be used in the invention.

Many video enhancement techniques exist and they all modify the picture content such that the appreciation of the resulting picture is improved. The subjective characteristic of these enhancements complicate the optimization process and is likely the reason for the diversity in video enhancement algorithms. Various enhancement algorithms contribute by some means to the picture quality, and as a result, they often appear in a chain to profit from the individual strengths. Noise reduction and sharpness improvement algorithms are just a few examples out of a large set of enhancement algorithms. It will be understood that any of these known enhancement algorithms can be used in the invention.

A high-quality spatial enhancement function consists of a collection of algorithms that contribute to different aspects of sharpness. Some algorithms only improve the gradients in the picture by increasing its steepness, whereas others modify the amplitude of the gradients. It may seem that these algorithms are mutually exclusive, however, this is far from true. Both means to improve the gradient characteristics may be used, where a predefined model determines the individual contribution of each algorithm.

Returning to FIG. 2, the upscaled bitstreams v1 are processed in enhancement units 222 and 224 according to the enhancement algorithms in each unit. The resulting video streams from enhancement units 222 and 224 are inputted into subtraction units 226 and 228 respectively, wherein the bitstream v1 is subtracted from the resulting video streams from enhancement units 222 and 224 to produce video streams v2 and v3, respectively. Video streams v2 and v3 are inputted into the picture analyzer 230. The input bitstream 201 is also inputted into the picture analyzer 230 via splitter 232. The picture analyzer 230 compares v1, v2 and v3 with the original bitstream and determines how best to enhance the picture. The picture analysis performed by the picture analyzer can be performed in a variety of ways. For example, the picture analyzer 230 could compare v1, v2 and v3 with the original picture and select the video stream (v1, v2 or v3) which best approximates the original picture. Alternatively, the picture analyzer can use a mix of the different bitstreams using mix parameters ($\alpha$, $\beta$) or enhancement vectors such that the optimum overall picture quality is achieved from a combination of video streams. For example, the picture analyzer can select a vector representing the mix parameters for calculating the mixture of the enhanced base video streams to control the information in the residual bitstream using the selected vector. Furthermore, bit cost function can also be used in determining the best mix parameters as will be explained below with reference to FIG. 3. It will be understood that other schemes than the ones described can be used in the picture analyzer 230 and the invention is not limited thereto.

There are numerous advantages to using mix parameters in the picture analyzer 230. Firstly, this is a completely expandable system. If there are more functions to contribute to the sharpness of the picture, they can be easily accounted for. The new functions need not be optimized for the system. Secondly, the interdependencies of various functions can be accounted for while deciding on the suitable enhancement vectors. Thirdly, a spatio-temporal consistency model can be incorporated in the picture analyzer 230.

The upscaled output of the upscaling circuit 216 is subtracted from the original input 201 in a subtraction circuit 234 to produce a residual bitstream which is applied to a switch 236. The switch is controlled by the output of the picture analyzer 230. By comparing the input video bitstream 201 with the various enhanced base video streams, the picture analyzer 230 can determine which pixels or groups of pixels (blocks) need to be further enhanced by the enhancement layer 208. For the pixels or groups of pixels (blocks) that are determined to need enhancement by the picture analyzer 230, the picture analyzer 230 outputs a control signal to close switch 236 to let those parts of the residual bitstream through to the enhancement layer encoder 240. The picture analyzer 230 also sends the selected mix parameters and the control signal for the switch to the encoder 240 so that this information is encoded with the resulting residual bitstream from switch 236 and outputted as the enhancement stream 241.

The base stream 215 is sent to a base decoder 250 and the enhancement stream 241 is sent to an enhancement encoder 252 in the decoder section 204. The decoder 250 decodes the base stream 215 which is then upscaled by an upscaling circuit 254. The upscaled decoded bitstream is then split by a splitter 256 and sent to enhancement units 262 and 264, merge unit 270 and addition unit 272. Enhancement unit 262 comprises the same spatial enhancement algorithm as enhancement unit 222 and enhancement unit 264 comprises the same spatial enhancement algorithm as enhancement unit 224. The enhancement units 262 and 264 perform their respective algorithms and send outputs v2 and v3 to the merge unit 270.

The enhancement decoder 252 decodes the enhancement stream and outputs the residual bitstream to the addition unit 272. In addition, the decoder 252 decodes the mix parameters and control signal and send this information to the merge unit 270. The merge unit merges together all of the inputs to create the enhancement output from the picture analyzer 230. The upscaled decoded base stream and the decoded residual bitstream are combined together by the addition unit 272 and the resulting bitstream is applied to the switch 274. The switch 274 is controlled by the control signal so that the output of the merge unit 270 can be applied to the appropriate pixels or blocks in the bitstream outputted by the addition unit 272 so as to produce the output signal 276.

Figure 3:
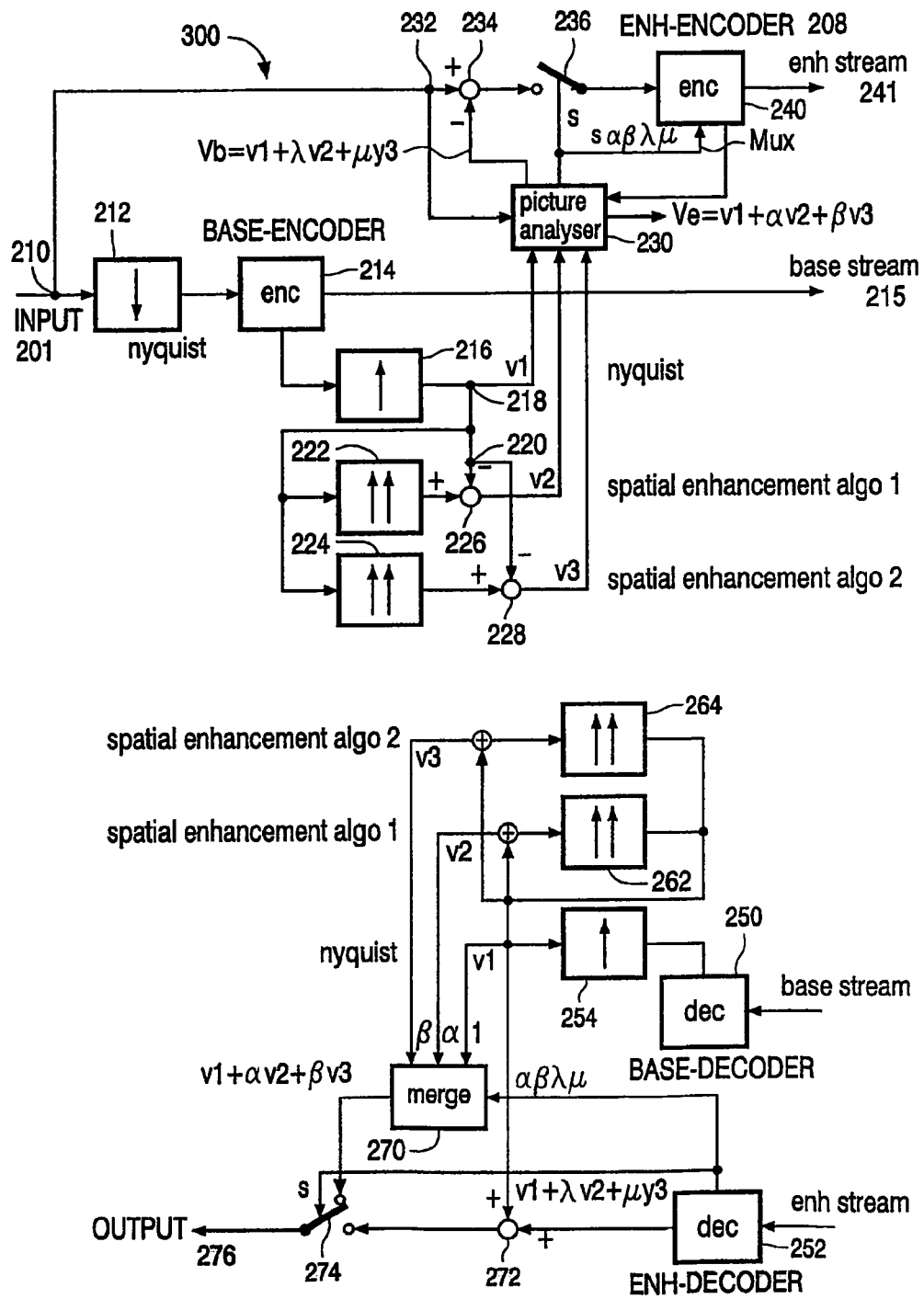
FIG. 3 is a block diagram of a layered video encoder/decoder according to one embodiment of the invention.
Figure 4:
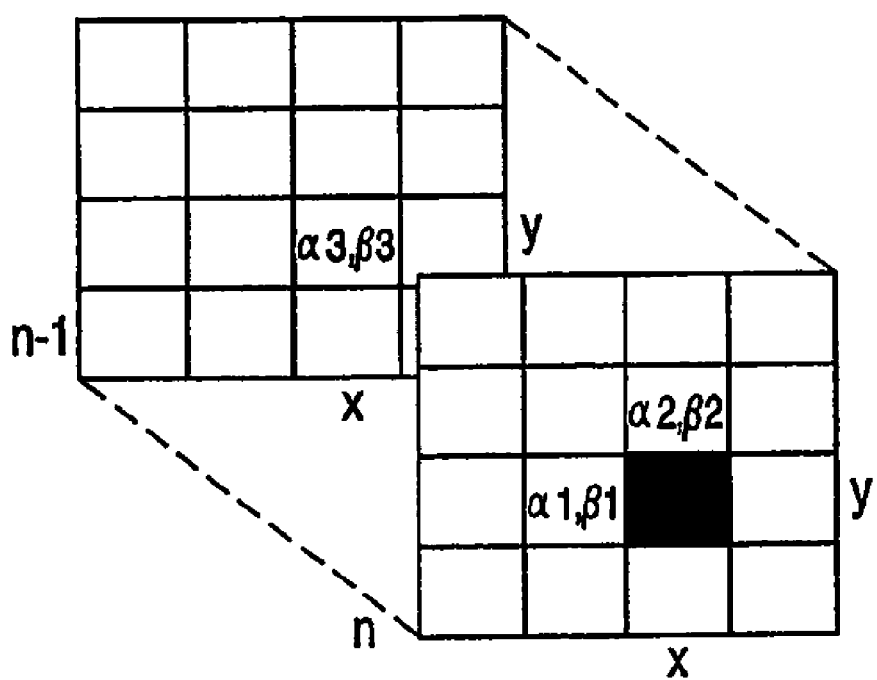
FIG. 4 is an illustration of a vector candidate set location according to one embodiment of the invention.

FIG. 3 is a block diagram of an encoder/decoder 300 according to another embodiment of the invention. Many of the components in FIG. 3 are the same as the components illustrated in FIG. 2 so they have been given the same reference numerals. In addition, for the sake of brevity, the operations of the similar components will not be described. In this embodiment, a cost function is used in determining the mix parameters $\alpha$, $\beta$, ... for the individual enhancement signals v2, v3, .... According to one embodiment of the invention, enhancement vectors are assigned on a block by block basis. Previously determined best enhancement vectors from a spatio-temporal neighborhood are evaluated in a cost function as illustrated in FIG. 4. The cost function calculates a metric that is related to the objective picture quality. The best estimate of the enhancement vector is defined by one yielding the smallest cost, i.e., Best vector=min $e(\alpha_i, \beta_i, ...)$ where i=1, 2, ... number of candidates and e() is the cost function with vectors $\alpha_i, \beta_i, ...$ as parameters.

The cost function should incorporate within itself all the factors that define good quality and also artifact prevention mechanism. For example, in case of sharpness enhancement function, the steepness of the gradients is an important factor and should be accounted for in the cost function. Artifacts like aliasing that result from sharpness improvement should also be included in the cost function. The cost function serves as a quality measure.

Returning to FIG. 3, the enhancement layer encoder 240 sends bitcost information to the picture analyzer 230. The cost function is calculated from the mixed signal $Ve(\alpha, \beta, ...)$ for a limited set of parameters $\alpha, \beta, ...$. The better the picture quality of the signal $Ve(\alpha, \beta, ...)$, the lower the cost function becomes. For every pixel or group of pixels a few vectors of can be tested. The test vector with the lowest cost function is then selected. In one embodiment, some of the test vectors are already selected vectors of neighboring, in time and space (previous frame), group of pixels. For example, vectors $\lambda_1\beta_1, \lambda_2\beta_2, \lambda_3\beta_3$ illustrated in FIG. 4 are neighbors of the group of pixels being tested. In addition one or more vectors can be selected with a random offset. The picture analyzer outputs $Ve=v1+\alpha v2+\beta v3$ and $Vb=v1+\lambda v2+\mu v3$ where $\alpha$, $\beta$ are the mix parameters and $\lambda$, $\mu$ are the cost function parameters. In this embodiment, the signal Vb is subtracted from the original input bitstream in the subtractor 234 to form the residual bitstream. Whenever the final cost function exceeds a predetermined threshold limit, the picture analyzer outputs a signal s to the switch 236 so that the switch will close and for that group of pixels a residual bitstream is encoded in the encoder 240. In addition, the picture analyzer also sends the control signal, the mix parameters and the cost function to the encoder 240 which are then coded and inserted into the enhancement stream 241. When the enhancement stream is decoded in the enhancement decoder 252, the mix parameters and cost function are decoded and sent to the merge unit 270. The merge unit outputs Vb which is added to the decoded enhancement stream in the addition unit 272 and the resulting bitstream is applied to the switch 274. The switch 274 is controlled by the control signal S so that Ve from the merge unit 270 can be applied to the appropriate pixels or blocks in the bitstream outputted by the addition unit 272 so as to produce the output signal 276.

The above-described embodiments of the invention enhance the efficiency of spatial scalable compression by using a picture analyzer to select the best or a mix of a plurality of enhanced base bitstreams via determined enhancement vectors to control the information in the encoded residual bitstream. It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

The invention claimed is:

1. A layered encoder for encoding an input video bitstream, the encoder comprising:
    a layered encoder unit for encoding a base bitstream at a lower resolution and a residual bitstream, the layered encoder unit comprising:
        a number of enhancement units, each with a different enhancement algorithm for enhancing a decoded upscaled base stream and outputting enhanced base video streams;
        a picture analyzer for comparing the input video bitstream with the decoded upscaled base bitstream and the enhanced base video streams, where the output of the picture analyzer controls the information included in the residual bitstream.

2. The layered encoder according to claim 1, wherein the picture analyzer selects a vector representing mix parameters for calculating the mixture of the enhanced base video streams and controls the information in the residual bitstream using the selected vector.

3. The layered encoder according to claim 2, wherein the picture analyzer compares the selected mixture of enhanced base video streams with the input video bitstream to determine for which pixels or group of pixels additional enhancement is required via the residual bitstream.

4. The layered encoder according to claim 2, wherein each group of pixels is enhanced using different vectors.

5. The layered encoder according to claim 2, wherein the picture analyzer calculates a cost function for a limited number of test vectors and the test vector with the lowest cost function is selected.

6. The layered encoder according to claim 5, wherein the selected vector is included in a compressed data stream.

7. The layered encoder according to claim 5, wherein a number of the test vectors are already selected vectors of neighboring, in time and space, group of pixels.

8. The layered encoder according to claim 1, wherein the layered encoding unit further comprises:
- a downsampling unit for reducing the resolution of the input video bitstream;
- a base encoder for encoding the lower resolution base stream;
- an upscaling unit for decoding and increasing the resolution of the base stream to produce an upscaled base bitstream;
- a subtraction unit for subtracting the upscaled base bitstream from the input video bitstream to produce the residual bitstream;
- switching means for selectively allowing only portions of the residual bitstream to be sent to an enhancement encoder based upon a control signal from the picture analyzer;
- the enhancement encoder for encoding the portions of the residual bitstream which pass through the switching means to form the encoded residual bitstream.

9. The layered encoder according to claim 8, wherein said switching means is a multiplier having a value between 0 and 1, wherein a value of 0 means the switching means is open and a value of 1 means the switching means is closed.

10. A layered decoder unit for decoding a base bitstream and a residual bitstream, the layered decoder unit comprising:
- means for enhancing the decoded base bitstream, the means for enhancing comprising a plurality of enhancement units having different enhancement algorithms for outputting an enhanced base video stream, and
- means for superimposing the decoded residual bitstream on the enhanced base video stream.

11. A layered decoder unit as claimed in claim 10, wherein the decoder is arranged to receive a vector representing mix parameters for calculating the mixture of enhanced base streams produced by the plurality of enhancement units in order to produce the enhanced base video stream.

12. A method for encoding an input video bitstream the method comprising the steps of:
- encoding a base bitstream and a residual bitstream, comprising the steps of:
  - enhancing a decoded upscaled base bitstream in a plurality of different enhancement algorithms outputting enhanced base video streams;
  - comparing the input video bitstream with the decoded upscaled base bitstream and the enhanced base video streams, where the output of the comparision controls the information contained in the residual bitstream.

13. The method according to claim 12, wherein a vector representing mix parameters for calculating a mixture of the enhanced base video streams is selected controls the information in the residual bitstream using the selected vector.

14. The method according to claim 13, wherein the selected mixture of enhanced base video streams is compared with the input video bitstream to determine for which pixels or group of pixels additional enhancement is required via the residual bitstream.

15. The method according to claim 13, wherein each group of pixels is enhanced using different vectors.

16. The method according to claim 13, wherein a cost function for a limited number of test vectors is calculated and the test vector with the lowest cost function is selected.

17. The method according to claim 16, wherein the selected vector is included in a compressed data stream.

18. The method according to claim 16, wherein a number of the test vectors are already selected vectors of neighboring, in time and space, group of pixels.

19. The method according to claim 12, further comprising the steps of:
- reducing the resolution of the input video bitstream;
- encoding the lower resolution base stream;
- decoding and increasing the resolution of the base stream to produce an upscaled base bitstream;
- subtracting the upscaled base bitstream from the input video bitstream to produce the residual bitstream;
- selectively allowing only portions of the residual bitstream to be sent to an enhancement encoder based upon a control signal from the picture analyzer;
- encoding the selectively allowed portions of the residual bitstream to form the encoded residual bitstream.

20. A method of decoding a base bitstream and a residual bitstream, the decoding comprising:
- enhancing the decoded base bitstream in a plurality of different enhancement algorithms for outputting an enhanced base video stream, and
- superimposing the decoded residual bitstream on the enhanced base video stream.

21. A method of decoding as claimed in claim 20, wherein the method further comprises receiving a vector representing mix parameters for calculating the mixture of enhanced base streams produced by the plurality of enhancement units in order to produce the enhanced base video stream.

22. A compressed data stream including:
- a base bitstream and a residual bitstream, wherein the information included in the residual bitstream represents a difference between a bitstream at higher resolution than the base bitstream and an enhanced decoded upscaled base bistream, which enhanced decoded upscaled base bitstream is based on the base bitstream and wherein the enhancement has been performed by a mixture of a plurality of enhancement algorithms.

23. A compressed data stream as claimed in claim 22, wherein the compressed data stream includes a vector representing mix parameters for calculating the mixture.

24. A storage medium on which a compressed data stream as claimed in claim 22 has been stored.

25. A layered encoder/decoder for encoding and decoding an input video bitstream, comprising:
- a layered encoder unit for encoding a base bitstream at a lower resolution and a residual bitstream, the layered encoder unit comprising:
  - a number of enhancement units, each with a different enhancement algorithm for enhancing a decoded upscaled base stream and outputting enhanced base video streams;

a picture analyzer for comparing the input video bitstream with the decoded upscaled base bitstream and the enhanced base video streams, where the output of the picture analyzer controls the information contained in the residual bitstream;

a layered decoder unit for decoding the base bitstream and the residual bitstream, the layer decoder unit comprising:

means for performing the same enhancement to the decoded base bitstream as was performed in the encoder unit; and means for superimposing the decoded residual bitstream on the decoded and enhanced video base stream to produce a video output stream.

* * * * *